United States Patent
Walberg

[11] 3,917,041
[45] Nov. 4, 1975

[54] THERMAL PROTECTIVE ARRANGEMENT FOR CLUTCHES
[75] Inventor: Maynard E. Walberg, Independence, Mo.
[73] Assignee: Allis-Chalmers Corporation, Milwaukee, Wis.
[22] Filed: June 7, 1974
[21] Appl. No.: 477,275

[52] U.S. Cl............ 192/30 W; 192/82 T; 192/84 A; 337/104
[51] Int. Cl............................................. F16d 43/25
[58] Field of Search............ 192/30 W, 82 T, 84 A; 337/104, 377

[56] References Cited
UNITED STATES PATENTS

| | | | |
|---|---|---|---|
| 2,414,531 | 1/1947 | Johns | 337/104 |
| 2,494,269 | 1/1950 | Sparkes | 192/30 W |
| 2,514,693 | 7/1950 | Chapman | 192/30 W |
| 2,539,534 | 1/1951 | Eckhardt | 192/30 W |
| 2,847,536 | 8/1958 | Bishop | 337/104 X |
| 3,184,024 | 5/1965 | Aschauer | 192/82 T |

*Primary Examiner*—Allan D. Herrmann
*Attorney, Agent, or Firm*—Robert C. Sullivan

[57] ABSTRACT

There is shown in the illustrated embodiment a thermal protective arrangement for an electric clutch of the type having a clutch housing which carries an electrical winding and an armature which is attracted into magnetic clutching engagement with the clutch housing when the electrical winding is energized, to thereby drive a mechanism connected to the armature. The electrical magnetizing winding is electrically connected in series with a contact operated by a shut-down thermostat which is set to deenergize the magnetizing winding when the thermostat senses a temperature such as a temperature in the range of 160°F–200°F, which is substantially above normal ambient temperature. An electrical heater means controlled by a second thermostat is mounted in heat exchange relationship with the shut-down thermostat to bias the temperature in the region of the shut-down thermostat to some value below the temperature at which the shut-down thermostat opens the circuit of the magnetizing winding, whereby only a relatively small increment of heat from slip friction of the clutch due to overload, such as a 20°F temperature rise, for example, sensed by the shut-down thermostat will cause the shut-down thermostat to deenergize the magnetizing winding with consequent declutching of the clutch.

12 Claims, 4 Drawing Figures

U.S. Patent  Nov. 4, 1975  3,917,041
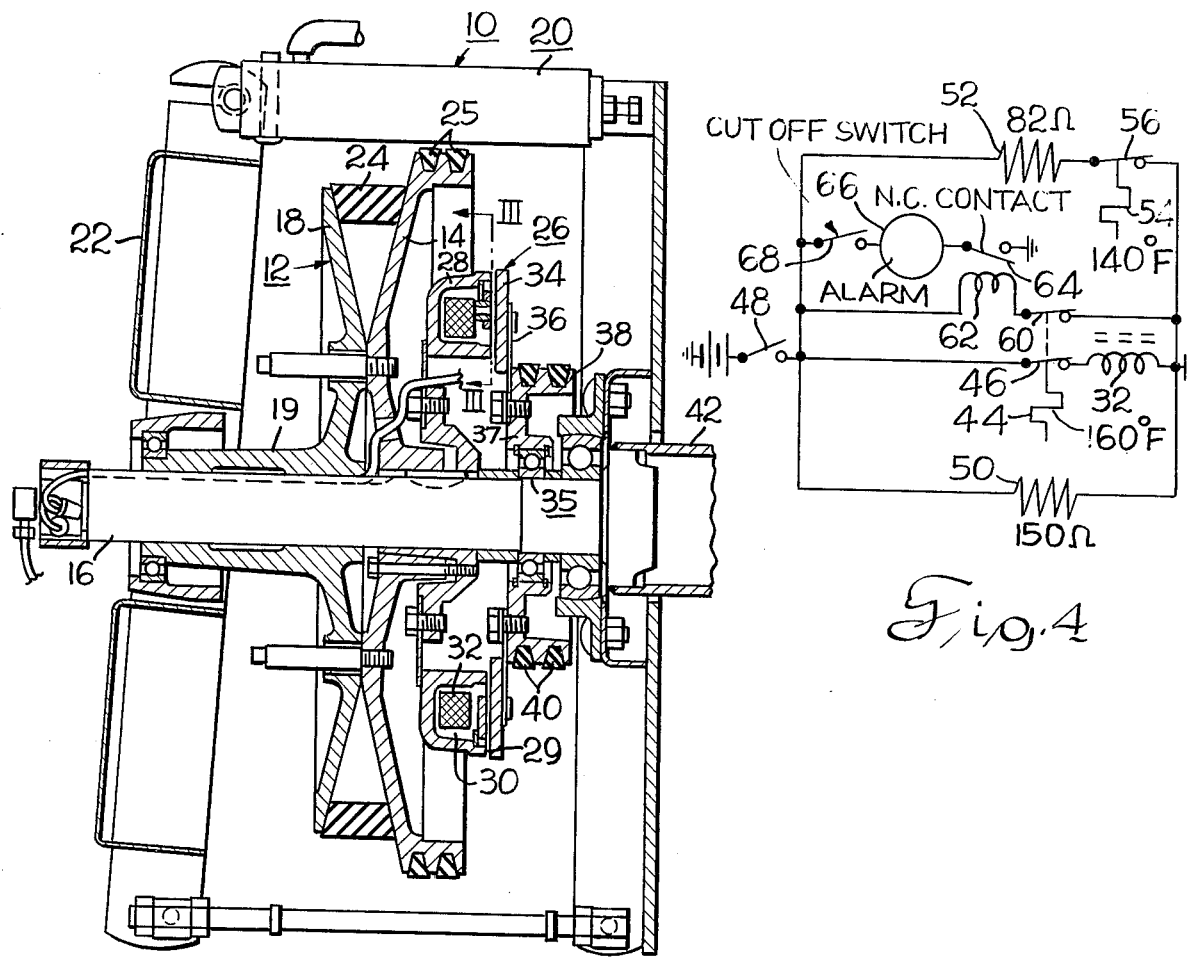
Fig. 1
Fig. 4
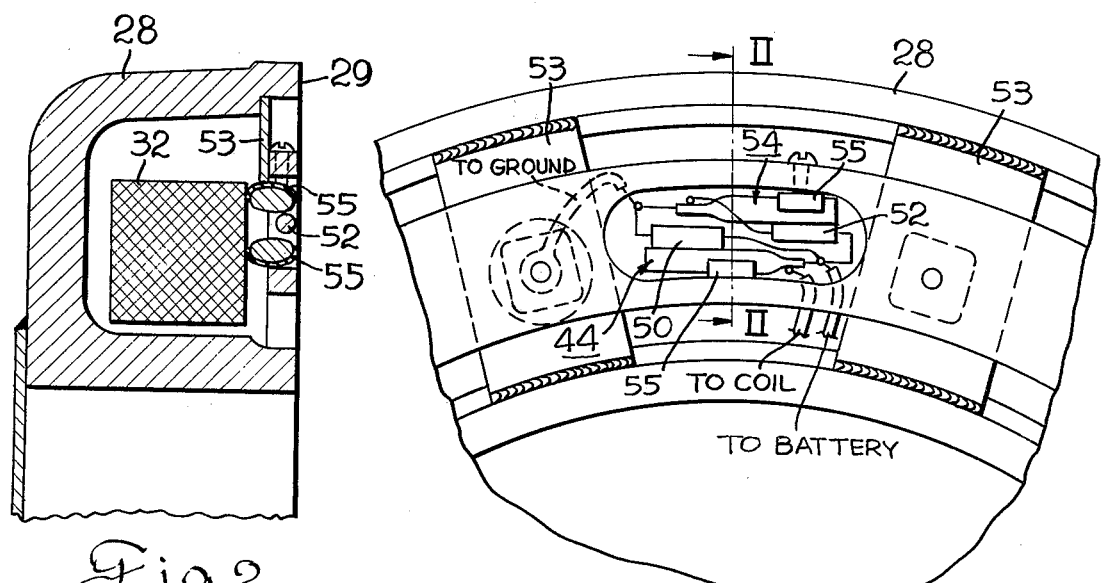
Fig. 2
Fig. 3

THERMAL PROTECTIVE ARRANGEMENT FOR CLUTCHES

BACKGROUND OF THE INVENTION

1. Field of the Invention

This invention relates to a thermal protective arrangement for clutches, and to a clutch having such thermal protective arrangement, and more particularly to a thermal protective arrangement for clutches in which a predetermined substantially constant and relatively small increment of heat output from a clutch due to slip friction or the like will cause a declutching operation. The invention will be described as embodied in a thermal protective arrangement for an electric clutch. However, the protective arrangement of the invention is not restricted to use in electric clutches and may be used in other types of clutches.

2. Description of the Prior Art

It has been known in the prior art to provide thermostatic devices which sense the temperature of a clutch and cause a declutching operation when the temperature of the clutch rises to a predetermined level. Such temperature rise of the clutch is normally due to an overloading of the clutch which causes slippage and consequent heat generation by the slippage of the clutch. To prevent nuisance (i.e. nonessential) shutdown, thermal protective devices for clutches may be set to perform the declutching operation at a temperature such as, for example, 160°F, which is significantly higher than the maximum ambient temperature, with the result that excessive time may be required for the slipping clutch to raise the temperature of the thermostat to the level necessary to cause the declutching operation. During this excessive running time required for the slipping clutch to heat the protective thermostat to the high shut-off temperature to which the thermostat is set, damage may be done to the clutch and furthermore the apparatus of which the clutch forms a part is performing inefficiently. The heat of slip friction causes warpage of the clutch faces and melting or burning of the insulation around the magnetic coil of an electric clutch, making the clutch unfit to deliver rated torque.

Furthermore, with thermal protective devices for clutches where the control thermostat is set at a predetermined value such as 160°F, for example, at which declutching will be initiated, the length of time required for the heat generated by the slipping clutch to reach the thermostat setting may vary depending upon the ambient temperature. Thus, on a cold day considerably more time may be required for the slipping clutch to trigger the thermostat into declutching operation than on a warm day.

STATEMENT OF THE INVENTION

Accordingly, it is an object of the present invention to provide an improved thermal control arrangement for clutches, and to provide a clutch having such a thermal control, in which a predetermined heat output from the clutch due to slip friction at the clutch faces caused by overloading of the clutch will initiate a declutching operation.

It is a further object of the invention to provide an improved thermal control for clutches and a clutch having such an improved thermal control in which a declutching operation is initiated by the control upon the sensing of a predetermined relatively small but significant increment of temperature rise (such as 20°F, for example) sensed by the control thermostat and due to heat generated by slip friction of the clutch faces.

It is a further object of the invention to provide an improved thermal control for clutches and a clutch having such an improved thermal control in which slip friction of the clutch is sensed more rapidly than in prior art thermal control devices for clutches and before any significant wear or damage to the clutch faces due to the slip friction has occurred.

It is a further object of the invention to provide an improved thermal control for clutches and a clutch having such improved thermal control in which approximately the same increment of temperature rise of the clutch will initiate a declutching operation substantially independent of any variation in ambient temperature.

It is a further object of the invention to provide a thermal control arrangement for a clutch in which the thermal sensing means such as a thermostat is thermally biased to a value near the trigger point of the thermal sensing means, whereby it can rapidly respond to an increment of heat input generated by slip friction of the clutch, thereby avoiding damage to the clutch due to overheating.

In achievement of these objectives there is provided in accordance with an embodiment of the invention a thermal protective arrangement for an electric clutch of the type having a clutch housing which carried an electrical winding and an armature which is attracted into magnetic clutching engagement with the clutch housing when the electrical winding is energized, to thereby drive a mechanism connected to the armature. The electrical magnetizing winding is electrically connected in series with a contact operated by a shut-down thermostat which is set to deenergize the magnetizing winding when the thermostat senses a temperature such as a temperature in the range 160°F–200°F, which is substantially above normal ambient temperature. Electricl heater means controlled by a second thermostat are mounted in heat exchange relationship with the shut-down thermostat to bias the temperature in the region of the shut-down thermostat to some value below the temperature at which the shut-down thermostat opens the circuit of the magnetizing winding, whereby only a relatively small increment of heat from slip friction of the clutch due to overload, such as a 20° F temperature rise, for example, sensed by the shut-down thermostat, will cause the shut-down thermostat to deenergize the magnetizing winding with consequent declutching of the clutch.

Further objects and advantages of the invention will become apparent from the following description taken in conjunction with the accompanying drawings in which:

BRIEF DESCRIPTION OF THE DRAWINGS

FIG. 1 is a view in sectional elevation of a power transmission apparatus embodying a clutch having the thermal protective apparatus of the invention;

FIG. 2 is an enlarged fragmentary view in longitudinal section showing the mounting arrangement for the thermal protective device of the invention taken along line II—II of FIG. 3;

FIG. 3 is a view taken substantially along line III—III of FIG. 1 showing the thermal control apparatus in position on the clutch structure; and FIG. 4 is a schematic wiring diagram of the thermal control apparatus of the invention.

DESCRIPTION OF THE PREFERRED EMBODIMENT

Referring now to FIG. 1, there is shown a power transmission apparatus generally indicated at 10 comprising a variable ratio sheave generally indicated at 12. Sheave 12 comprises a first disc 14 which is fixed to and rotates with a center shaft 16, and a second disc 18 which is slidably movable in an axial direction along the outer surface of shaft 16 whereby to vary the ratio of the variable ratio sheave 12, as is well known in the art. A hydraulic motor generally indicated at 20 is mounted on the power transmission structure, and the movable element of the hydraulic motor 20 is suitably connected through structure 22 to the hub portion 19 of the movable sheave disc 18 whereby to permit adjustment of the spacing between movable sheave disc 18 and fixed sheave disc 14 to vary the output ratio of the sheave 12. A belt 24 is trained around the variable ratio sheave 12 and the belt 24 may be either power input or power output belt relative to sheave 12 as desired. Additional second belts 25 are trained around the outer periphery of the axially fixed sheave disc 14.

A clutch generally indicated at 26 forms part of the power transmission apparatus and comprises a clutch housing generally indicated at 28 which is keyed to and rotates with shaft 16. Clutch housing 28 is made of a suitable magnetic material such as iron or steel and comprises a hollow, annular-shaped interior 30 in which is suitably mounted an electrical winding 32. Clutch 26 also comprises an armature member 34 made of a suitable magnetic material such as iron or steel which is adapted to be magnetically attracted into engagement with the axially outer end or clutch face 29 of clutch housing 28 when electrical winding 32 is energized. Armature 34 is mechanically connected by means of a flexible strip member 36, which may be of annular shape, to a pulley member 38 which constitutes the member to be clutched. Pulley member 38 is mounted by means of a ball bearing support generally indicated at 35 on the outer periphery of shaft 16. The outer cage 37 of the ball bearing support is secured to the radially inner periphery of pulley 38 and the inner cage of the ball bearing support is mounted about the periphery of shaft 16.

When electrical winding 32 is energized to magnetize clutch housing 28, armature 34 is magnetically attracted to and is magnetically held in engagement with clutch face 29 of clutch housing 28 whereby pulley 38 rotates with clutch housing 28 when shaft 16 is rotating. Clutch housing 28 is keyed to and rotates with shaft 16 as previously mentioned. Hence, when electrical coil 32 of clutch 26 is energized, and assuming that there is no slippage of armature 34 relative to clutch housing 28, the pulley 38 rotates with the clutch housing 28 and hence rotates with shaft 16. However, due to the ball bearing support for pulley 38, pulley 38 is free to rotate relative to the shaft 16 when an overload occurs, in which case clutch armature 34 slips relative to clutch housing 28.

A pair of belts 40 are trained around the outer periphery of pulley 38. Hence, pulley 38 and belts 40 trained around pulley 38 may constitute an auxiliary power take-off relative to main shaft 16.

A hollow shaft part 42 is welded to the right-hand end of shaft 16 and rotates with shaft 16. The power input to shaft 16 may be by way of belts 25 which are trained around the sheave disc 14, in which case the variable sheave belt 24 and the shaft part 42 would represent power outputs from the system. On the other hand, power input could be through the shaft part 42 which is integral with shaft 16. The clutched pulley 38 and belts 40 which are trained around pulley 38 would normally, although not necessarily, be an auxiliary output of the system rather than an input to the transmission system.

Description of the Thermal Control for Clutch

As best seen in the wiring diagram of FIG. 4, the electrical winding 32 which magnetizes clutch housing 28 is connected in series with normally closed contact 46 of a first thermal sensing means in the form of a thermostat generally indicated at 44 which may be of the bimetal type, contact 46 being connected to the positive terminal of the battery B in series with an on-off switch 48. The opposite side of the electrical winding 32 is connected to ground and thus to the negative terminal of the battery B. Battery B may have an output voltage of 12 volts, for example. Thermostat 44 may be set, for example, to open contact 46 at a temperature of 160° Fahrenheit. Thermostat 44 may be of the bimetal type or of any other suitable type. After opening, contact 46 may not reclose until a temperature substantially lower than 160° F is sensed by thermostat 44.

An electrical resistance heater element 50 is connected across the terminals of battery B in series with the on-off switch 48. Heater 50 may have a resistance of 150 ohms, for example. A second electrical resistance heater element 52 is provided and may have a resistance, for example, of 82 ohms. Heater 52 is connected in series with the normally closed contact 56 of a second thermal sensing means in the form of a thermostat generally indicated at 54. Thermostat 54 may also be of the bimetal type. The series connection of heater 52 and of the thermostat-operated contact 56 is connected in series with on-off switch 48 across the terminals of battery B. Thermostat 54 is designed or adjusted to open contact 56 to deenergize heater 52 when the temperature to which thermostat 54 is exposed reaches a value of 140° Fahrenheit, for example. The two heaters 50 and 52 are embedded in a heat conducting but electrically insulating epoxy resin and are placed close to and in heat exchange relation with thermostats 44 and 54. The assembly of thermostats 44, 54 and heaters 50, 52 is electrically insulated from clutch 26 by strips 55 of a suitable insulating material such as "Mylar" or other suitable insulating material which holds the assembly of the four elements 44, 50, 52, 54 together in good heat transfer relation with respect to each other. Also, shut-down thermostat 44 is in good heat exchange relation with clutch housing 28 in the region where housing 28 is engaged by armature 34, in such manner as to detect any heat increase due to slip friction caused by slippage of armature 34 relative to clutch face 29 of clutch housing 28.

The assembly of the two thermostats 44 and 54 and of the two heaters 50 and 52 is suitably supported in close proximity to each other within a recess 59 in an annular plate 53 which in turn is supported within the annular-shaped interior 30 of clutch housing 28 by mounting brackets 57. The assembly just described in mounted contiguous the clutch face 29 of clutch housing 28 which is engaged by clutch armature 34, and thus shut-down thermostat 44 is exposed to any heat generated by slip friction of the clutch, should slippage of armature 34 relative to clutch face 29 occur.

It might be noted that in the description which follows, it is assumed that the shut-down thermostat 44 is adjusted or set to open contact 46 when thermostat 44 senses a temperature of 160°F. However, it will be understood that the value of 160°F is given only by way of example of a temperature setting which is substantially above the normal ambient. Instead of the value of 160°F, the thermostat 44 might be set to open contact 46 at some value in the range 160°F–200°F, for example, the particular value of shut-down temperature chosen for thermostat 44 depending upon various factors, such as the geometry of the clutch and the heat transfer characteristics in the region of the clutch where thermostat 44 is positioned, the selection of the shut-down temperature of thermostat 44 also depending upon the normal ambient temperature to which thermostat 44 is exposed. In any event, the shut-down temperature at which thermostat 44 opens contact 46 in the circuit of magnetizing winding 32 is set substantially above the ambient temperature, so as to avoid "nuisance" shut-down of the clutch.

In the description which follows, it has also been assumed that the resistance heaters 50 and 52 have been so selected and cooperate with each other and with thermostat 54 to maintain a biasing temperature of 140°F in the region of shut-down thermostat 44. Here again, it will be realized that the value of 140°F is chosen only by way of example, and that the particular value of biasing temperature will depend to a large extent upon the value of shut-down temperature to which shut-down thermostat 44 is set. There should be a temperature differential $\Delta T$ between the biasing temperature maintained by thermostat 54 and the temperature at which shut-down thermostat 44 opens the circuit of magnetizing winding 32, this differential $\Delta T$ being a value such as 20°F, for example, which is indicative of significant heat generated by slip friction of the clutch.

The resistance value of continuously energized heater 50 is so selected that after it has had time to establish thermal equilibrium, heater 50, aided by a thermal contribution from the ambient temperature which may vary from day to day, will serve to maintain a temperature in the region of thermostat 44 at some value less than, but preferably not a great deal below, a temperature of 140°F. Heater 52 which is connected in series with the contact 56 of thermostat 54 cooperates with the continuously energized heater 50. In fact, upon initial activation of the thermal control system, the heater 52, which has a substantially lower resistance and substantially higher current flow therethrough than the continuously energized heater 50, will heat up rapidly to quickly raise the temperature in the vicinity of thermostats 44 and 54 to the biasing temperature of close to 140°F. However, when the temperature contiguous the thermostats 44 and 54 reaches the 140°F level, thermostat 54 which is set to open at 140°F will open contact 56 to deenergize heater 52. Subsequently, if the temperature drops a predetermined amount below the predetermined biasing temperature of 140°F, thermostat 54 will reclose contact 56 to reenergize heater 52 to supply more heat to the system. The combination of the two heaters 50 and 52 might be thought of as an adjustable resistance in which part of the resistance, namely the part represented by continuously energized heater 50, is continuously supplying heat to the system sufficient to maintain the temperature of the system at some value lower than 140°F and in which the adjustable part of the heater system, namely that represented by the discontinuous heater 52, is cycled on and off under the control of thermostat 54 to supplement heater 50 as required to maintain the temperature of the system close to the preestablished desired value of 140°F. Thus, the two heaters 50 and 52 cooperate together to maintain a temperature of about 140°F. for the environment of thermostats 44 and 54.

Assuming that thermostat 44 is adjusted to open contact 46 at a value such as 160°F, it will be seen that there is normally a temperature differential of 20°F necessary to trigger thermostat 44 to open its associated contact 46. With the temperature in the thermostat area maintained by heaters 50 and 52 at a temperature of approximately 140°F as just described, assume that an overload occurs on the clutch such that slippage of armature 34 relative to clutch face 29 of clutch housing 28 occurs. This will cause the generation of additional heat in the region of thermostats 50 and 54 to raise the temperature in that region to a level above the normal 140°F. Since the thermostat 44 whose contact 46 is in series with clutch magnetizing winding 32 is set to perform a declutching operation at a temperature of 160°F, it can be seen that a temperature rise due to heat input from the slip friction representing an increment of only 20°F is necessary to raise the temperature in the thermostat area to a value which will cause thermostat 44 to open contact 46 and thus to deenergize clutch magnetizing winding 32. Since shut-down thermostat 44 is already biased to a temperature level near its trigger point, it can rapidly respond to the additional heat increment from the slip friction to open contact 46 to demagnetize clutch winding 32. The deenergization of magnetizing winding 32 will demagnetize clutch housing 28 and will permit armature 34 to become released from driving engagement with clutch face 29 of clutch housing 28 so that pulley 38 is no longer driven by the clutch housing 28. The flexible member 36 which supports armature 34 will then return to its natural unflexed condition in which there is a slight axial clearance between armature 34 and the contiguous face 29 of clutch housing 28. After the cause of the overload has been corrected, and the clutch has cooled down to a safe value, thermostat 44 will act to reclose contact 46 to reenergize winding 32 to permit resumption of the clutching operation.

A suitable alarm device 66 can be suitably connected in the circuit of FIG. 4 in such manner that the alarm is energized when the circuit of the magnetizing winding 32 of the clutch is deenergized due to the opening of contact 46. Thus, as shown in FIG. 4, thermostat 44 can operate a second contact 60 which is connected in tandem with contact 46. Contact 60 is connected in series with power On-Off switch 48 and with relay winding 62 across the power supply. Relay winding 62 controls a normally closed contact 64 which is connected in series with alarm 66 and in series with alarm cut-off switch 68 across the power supply. Before slip friction heat triggers the operation of shut-down thermostat 44, both contacts 46 and 60 are closed. Hence, under these conditions, relay coil 62 is energized to hold normally closed contact 64 in the alarm circuit open, and hence alarm 66 is not energized. However, when thermostat 44 opens contact 46 to deenergize magnetizing winding 32 of the clutch, the thermostat 44 simultaneously opens contact 60 to deenergize relay coil 62. Deenergization of relay coil 62 permits normally closed contact 64 to reclose to thereby energize the circuit of alarm 66, assuming alarm cut-off switch 68 in the alarm circuit is closed. To stop the alarm, cut-off switch 68 maybe opened.

It can be seen that the control system and apparatus hereinbefore described provides a heater system which heats or biases the shut-down thermostat 44 to some predetermined temperature value less than the temperature required to actuate the thermostat 44 for a declutching operation, and only the final increment of heat, which may be some predetermined value such as a 20°F rise above the level of the biasing temperature, is necessary in order to actuate the thermostat 44 to perform its declutching operation with a fast response time. This final increment of temperature rise which, as just stated, may be, for example, of the order of only 20°F, is supplied by the slip friction and insures an early detection of overload on the clutch without the necessity of requiring a large temperature increment due to slip friction or other overload symptom. Thus, the control apparatus of the invention by providing an early detection of overload and by requiring only a relatively small increment of temperature rise due to the overload to cause a declutching operation by the thermostat serves to prevent damage to the clutch and also serves to prevent inefficient operation of the clutching device and of the mechanical system to which the clutch is connected.

It might be noted that the broad concept of thermally biased thermostats is known in the art of household thermostats, but to my knowledge, this type of thermostat has not been applied in connection with thermal protection of clutches.

While the thermal sensing devices 44 and 54 have been described as being bimetal type thermostats, they could be other types of thermal sensing devices, such as (1) thermistors or (2) temperature sensing bellows devices, to cite two examples.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a clutch comprising a driving clutch member and a driven clutch member, said driven clutch member being clutchingly engageable with said driving clutch member whereby to drive said driven clutch member, and a thermal protective arrangement for said clutch whereby to effect declutching of said driven clutch member upon sensing of a predetermined heat output from said clutch, said thermal protective arrangement comprising a first thermal sensing means in heat exchange relation with said clutch, said first thermal sensing means being effective to cause a declutching operation of said driven member relative to said driving member when a predetermined temperature $T_2$ is sensed by said first thermal sensing means, said predetermined temperature being substantially above ambient temperature, heater means positioned in heat exchange relation with said first thermal sensing means, said heater means being effective to normally maintain the temperature in the region of said first thermal sensing means substantially at some biasing temperature value $T_1$ which is substantially $\Delta T$ degrees below said predetermined temperature $T_2$, whereby a heat input to said first thermal sensing means from said clutch of substantially only $\Delta T$ degrees is necessary to cause said first thermal sensing means to effectuate a declutching operation.

2. The combination defined in claim 1 in which said clutch is an electric clutch and comprises an electrical magnetizing winding which, when energized, is effective to magnetically engage said driven member in clutched engagement with said driving member.

3. The combination defined in claim 2 in which said first thermal sensing means is operatively associated with the electrical circuit of said electrical winding, and upon the sensing of said predetermined temperature $T_2$ effects a declutching operation by causing the deenergization of the circuit of said electrical winding, whereby said driven member is no longer magnetically engaged with said driving member.

4. The combination defined in claim 1 in which said heater means comprises a first heater in heat exchange relation with said first thermal sensing means, said first heater being continuously energized during operation of said clutch, said heater means additionally comprising a second heater also in heat exchange with said first thermal sensing means and cooperating with said first heater to maintain the temperature in the region of said first thermal sensing means at substantially said biasing temperature $T_1$, and a second thermal sensing means operatively associated with said second heater, said second thermal sensing means being effective to deenergize said second heater when said temperature in the region of said first thermal sensing means reaches substantially said biasing temperature $T_1$.

5. The combination defined in claim 3 in which said heater means comprises a first heater in heat exchange with said first thermal sensing means, said first heater being continuously energized during operation of said clutch, said heater means additionally comprising a second heater in heat exchange relation with said first thermal sensing means and cooperating with said first heater to maintain the temperature in the region of said first thermal sensing means at substantially said biasing temperature $T_1$, said first thermal sensing means being operatively associated with a first contact in circuit with said electrical winding, said first thermal sensing means being operable to operate said first contact when said predetermined temperature $T_2$ is sensed by said first thermal sensing means whereby to deenergize said electrical winding and thus cause declutching of said driven member relative to said driving member, a second thermal sensing means, said second thermal sensing means being operatively associated with a second contact, said second contact being in circuit with said second heater, said second thermal sensing means being operable to operate said second contact to deenergize said second heater when the temperature in the region of said first thermal sensing means reaches substantially said biasing temperature $T_1$.

6. The combination defined in claim 1 which additionally comprises an alarm which is actuated upon effectuation of a declutching operation by said first thermal sensing means.

7. A thermal protective apparatus for a clutch of the type comprising a driving clutch member and a driven clutch member is clutchingly engageable with said driving clutch member whereby to drive said driven clutch member, said thermal protective apparatus comprising a first thermal sensing means in heat exchange relation with said clutch, said first thermal sensing means being effective to cause a declutching operation of said driven member relative to said driving member when a predetermined temperature $T_2$ is sensed by said first thermal sensing means, said predetermined temperature being substantially above ambient temperature, heater means positioned in heat exchange relation with said first thermal sensing means, said heater means being effective to normally maintain the temperature in the region of said first thermal sensing means substantially at some temperature value $T_1$ which is substantially $\Delta T$ degrees below said predetermined temperature $T_2$, whereby a heat input to said first thermal sensing means from said clutch of substantially only $\Delta T$ degrees is necessary to cause said first thermal sensing means to effectuate a declutching operation.

8. A thermal control apparatus as defined in claim 7 in which said clutch is an electric clutch and comprises an electrical magnetizing winding which, when energized, is effective to magnetically engage said driven member in clutched engagement with said driving member.

9. A thermal control apparatus as defined in claim 8 in which said first thermal sensing means is operatively associated with the electrical circuit of said electrical winding, and upon the sensing of said predetermined temperature $T_2$ effects a declutching operation by causing the deenergization of the circuit of said electrical winding, whereby said driven member is no longer magnetically engaged with said driving member.

10. A thermal control apparatus as defined in claim 7 in which said heater means comprises a first heater in heat exchange relation with said first thermal sensing means, said first heater being continuously energized during operation of said clutch, said heater means additionally comprising a second heater in heat exchange with said first thermal sensing means and cooperating with said first heater to maintain the temperature in the region of said first thermal sensing means at substantially said biasing temperature $T_1$, and a second thermal sensing means operatively associated with said second heater, said second thermal sensing means being effective to deenergize said second heater when said temperature in the region of said first thermal sensing means reaches substantially said biasing temperature $T_1$.

11. A thermal control apparatus as defined in claim 9 in which said heater means comprises a first heater in heat exchange with said first thermal sensing means, said first heater being continuously energized during operation of said clutch, said heater means additionally comprising a second heater in heat exchange relation with said first thermal sensing means and cooperating with said first heater to maintain the temperature in the region of said first thermal sensing means at substantially said biasing temperature $T_1$, said first thermal sensing means being operatively associated with a first contact in circuit with said electrical winding, said first thermal sensing means being operable to operate said first contact when said predetermined temperature $T_2$ is sensed by said first thermal sensing means whereby to deenergize said electrical winding and thus cause declutching of said driven member relative to said driving member, a second thermal means, said second thermal sensing means being operatively associated with a second contact, said second contact being in circuit with said second heater, said second thermal sensing means being operable to operate said second contact to deenergize said second heater when the temperature in the region of said first thermal sensing means reaches substantially said biasing temperature $T_1$.

12. A thermal protective apparatus as defined in claim 7 in which additionally comprises an alarm which is actuated upon effectuation of a declutching operation by said first thermal sensing means.

* * * * *

PO-1050
(5/69)

UNITED STATES PATENT OFFICE
CERTIFICATE OF CORRECTION

Patent No. 3,917,041  Dated November 4, 1975

Inventor(s) Maynard E. Walberg

It is certified that error appears in the above-identified patent and that said Letters Patent are hereby corrected as shown below:

Column 9, line 3, after "clutch member" --- , and in which said driven clutch member --- has been omitted. Column 10, line 29, after "thermal" (first occurrence) --- sensing --- has been omitted.

Signed and Sealed this twenty-seventh Day of April 1976

[SEAL]

Attest:

RUTH C. MASON
Attesting Officer

C. MARSHALL DANN
Commissioner of Patents and Trademarks